Feb. 18, 1964   B. E. BALTHAZOR   3,121,294
TOY VEHICLE WITH SPRUNG AXLES
Filed Jan. 22, 1962
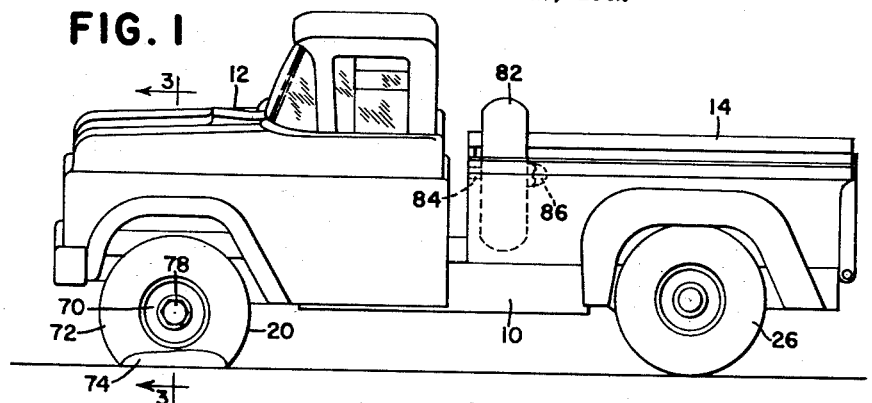
FIG. 1
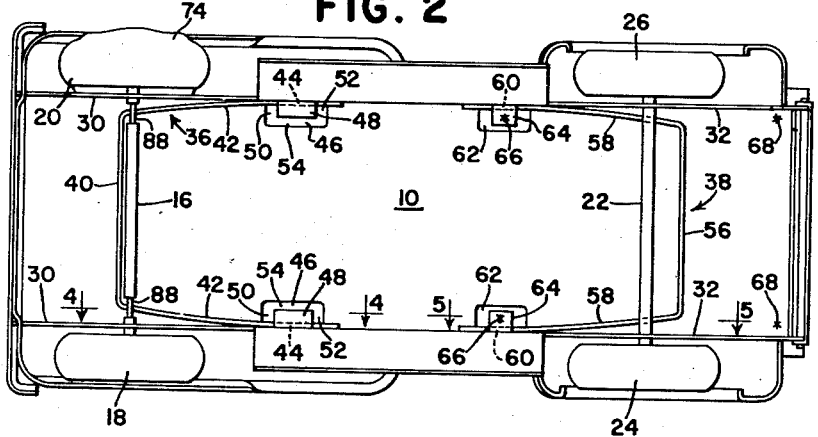
FIG. 2
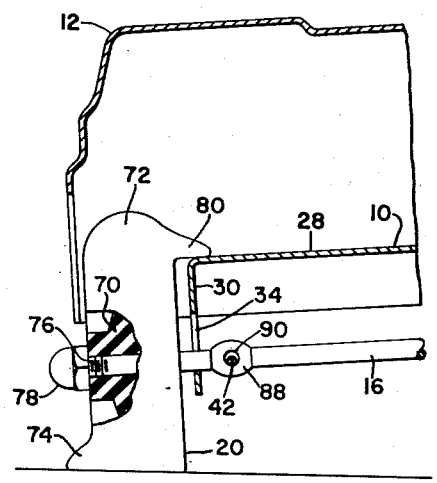
FIG. 3
FIG. 6
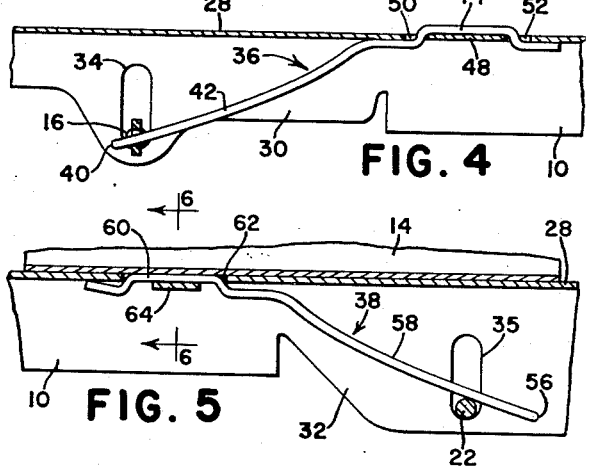
FIG. 4
FIG. 5
INVENTOR.
B. E. BALTHAZOR
BY
ATTORNEY

United States Patent Office 3,121,294
Patented Feb. 18, 1964

3,121,294
TOY VEHICLE WITH SPRUNG AXLES
Bernard E. Balthazor, Moline, Ill., assignor to Buddy L Corporation, East Moline, Ill., a corporation
Filed Jan. 22, 1962, Ser. No. 167,572
8 Claims. (Cl. 46—221)

This invention relates to a toy vehicle and more particularly to an improved axle and spring mounting therefor.

The principal object of the invention is to simulate, so far as is functionally possible, the spring suspension of actual vehicles so that the toy, which is essentially a scale model, is comparatively realistic. It is a further object of the invention to provide a spring and axle mounting which may be readily assembled so as to lend itself easily to mass-production methods. The construction also features as another object the provision of a design enabling production of a basic vehicle which may be optionally equipped with the spring axle.

It is a further object of the invention to utilize the spring mounting of the axle in such manner that the axle is held against rotation, which is important in those cases in which the wheels are removable, since the fixed axle permits ready screwing and unscrewing of a retaining member at one end. This is important in those cases in which the vehicle is provided with a simulated damaged wheel, such as a simulated flat tire, which is interchangeable with a spare wheel, which further adds to the realism of the construction.

The foregoing and other important objects and desirable features inherent in and encompassed by the invention will become apparent as a preferred embodiment thereof is disclosed in detail in the ensuing description and accompanying sheet of drawings, the figures of which are described below.

FIGURE 1 is a side elevation of a typical vehicle constructed according to the present invention.

FIGURE 2 is a bottom view of the same.

FIGURE 3 is an enlarged fragmentary section as seen generally along the line 3—3 of FIGURE 1.

FIGURE 4 is an enlarged section as seen generally along the line 4—4 of FIGURE 2.

FIGURE 5 is an enlarged section as seen generally along the line 5—5 of FIGURE 2.

FIGURE 6 is a fragmentary section as seen along the line 6—6 of FIGURE 5.

The vehicle chosen for purposes of illustration is a scale model pick-up truck, having a longitudinal or fore-and-aft body or chassis 10 including a forward cab and hood structure 12 and a rearward cargo-carrying part or body 14. The vehicle is supported at its front end by a front wheel and axle assembly including a transverse front axle 16 having a pair of front wheels 18 and 20 at opposite ends thereof. A rear axle assembly supports the rear end of the vehicle and comprises a transverse rear axle 22 having right- and left-hand rear wheels 24 and 26 thereon.

The body 10 is constructed in such fashion that in section it has an inverted U-shaped appearance, thereby including a transverse flat upper part 28 and opposite fore-and-aft depending flanges, which at the forward end of the vehicle afford transversely spaced apart depending supports 30 and which at the rear end of the vehicle provide depending supports 32.

The depending supports 30 are provided respectively with generally upright slots 34 which afford guide means for controlling limited vertical movement of the front axle 16 relative to the body. The rear supports 32 are similarly slotted at 35 for accomplishing the same function relative to the rear axle 22. Without more explanation, it will be seen that the axles are relatively loosely received in their respective slots so that the vertical movement they have relative to the body may be translational as well as "rocking," in the latter respect simulating somewhat independent wheel suspension. This is further augmented by the association with the axles of front and rear springs, designated respectively by the numerals 36 and 38.

As best seen in FIGURE 2, the front spring 36 comprises preferably a single one-piece member of spring wire or its equivalent, here having a transverse bight 40 and opposite fore-and-aft extending legs 42. Each leg 42 extends to a terminal end having an offset part or portion 44 of the configuration best shown in FIGURE 4, the purpose of which is to establish a connection between the underside of the body 10 and these terminal end portions of the spring legs. The spring 36 is initially formed with a laterally outwardly opposed bias in its legs 42; that is to say, before the spring is installed, the legs 42 assume a position considerably wider apart than that shown in FIGURE 2. This inherent bias enables retention of the spring after it is installed. For the purpose of completing the connection between the offset terminal end portions 44 and the body 10, the body is provided with a pair of transversely spaced apart connecting means, each in the form of a body portion specifically illustrated as a U-shaped slot 46 which borders on three sides a tab or body part 48 which, in the case of the mounting of the front spring, lies in the plane of the remainder of the body portion 28. In view of the U-shaped nature of the slot 46, it will be seen that it has front and rear opening or slot portions 50 and 52 respectively, which lie respectively ahead of and behind the associated tab 48. The front and rear slot portions are joined by a fore-and-aft slot portion 54, which borders the associated tab 48 along an inner edge thereof. In the specific case illustrated, the spring is installed so that its bight 40 lies ahead of the axle 16, the legs 42 extending rearwardly past the axle so that the terminal end portions 44 are connected respectively to their tabs 48, which obviously lie to the rear of the axle 16. The configuration at 44 is such that it may be inserted upwardly in the slot portion 54 and then shifted laterally to the ultimate position shown in FIGURE 2, which is facilitated because of the fact that, as previously stated, the legs 42 are initially biased apart. Hence, the terminal end portion extends upwardly through the front slot portion 50, over the tab 48, and then downwardly through the rear slot portion 52. The same is true, of course, at both sides of the vehicle. The inherent bias in the spring 36 is such that the bight end thereof acts downwardly on the axle 16 and therefore tends to keep same at the bottom of its guide slots 34.

Substantially the same structural and functional relationship occurs between the rear spring 38 and its mounting on the body and its relationship to the rear axle 32, at least in the broad sense, and except for differences that will be brought out below, that it biases the rear axle 22 to the lower ends of its slots 35. Hence, the rear spring 38 will be seen to have a bight 56 which is disposed to the rear of the rear axle 22, and this bight is joined to a pair of transversely spaced apart forwardly extending legs 58, each of which has an offset or configured terminal end portion 60 as best shown in FIGURE 5. Here again, the body is provided with a pair of transversely spaced apart connecting means, each of which includes a U-shaped slot 62 which for all essential purposes may be regarded as the same as the previously described slots 46. Each slot 62 borders on three sides a body part or tab 64, and again the "threading" of the end portions through the slot portions and over the tab 64 will be evident from a comparison thereof with that previously described in connection with the mounting of the front spring 36. A difference exists in the mounting of the rear spring, which is utilized here because of associated structure. Hence, the tab 64 may be displaced downwardly as shown in FIGURE 5 to facilitate gripping of the associated leg 58, and this may be further augmented by spot welding or otherwise connecting the tab to the underside of the cargo-carrying part 14, as indicated at 66. Additional spot welds, as at 68, may be utilized between the body 10 and the part 14.

Because each spring, 36, 38 is formed of spring wire or its equivalent, considerable flexibility is afforded and the lateral spacing of the respective spring legs 42—42, 58—58 is such that the wheels may simulate independent-wheel suspension. That is to say, either axle may move directly upwardly while remaining parallel to the body, or either end of either axle may move upwardly relative to the other, the axle and wheel assembly of course rocking about the opposite wheel. This feature is particularly important where, as here, the vehicle is equipped with a damaged wheel. As typical thereof, the left-hand front wheel 20 is in the form of a wheel that simulates a flat tire. This wheel has a body portion 70 and a tire portion 72, the lower or bottom part of which simulates a flat tire, as at 74. The end of the axle 16 on which the flat-tire wheel 20 is mounted is preferably threaded at 76 to receive an acorn nut 78. To assure that the wheel 20 will always be mounted on the end of the axle 16 with its flat portion 74 to the bottom, so that it will rest on the ground, the wheel is provided with means establishing an interlock with the body 10.

In the present case, the wheel 20 is of one-piece molded construction, of any suitable material such as any of the well-known plastics. Consequently, the simulated flat tire portion 74 is integral therewith. The means for establishing the interlock with the body 10 is an inwardly extending portion 80 formed integral with the tire portion 72 at the inboard side of the wheel substantially diametrically opposed to the flat tire portion 74. As best seen in FIGURE 3, the portion 80 extends inwardly of and lies in overlapping relationship to the flat body part 28 adjacent to the associated depending flange or support 30. Consequently, the wheel 20 can be installed in only one position and after it is installed it is non-rotatable out of that position; although, of course, there could possibly be some play existing between the tire portion 80 and the body portion 28 as the axle shifts upwardly or downwardly, depending upon the pressure applied to the front end of the vehicle at that side. The strength of the springs is such that the body will adapt itself to the vertical offset at one corner which results from the presence of the flat-tired wheel 20.

It is a further feature of the construction that the wheel 20 is removable and is interchangeable with any of the other wheels or with a spare wheel 82 which may be removably carried by any part of the body as suggested in FIGURE 1. This wheel may be a duplicate of any of the other wheels; that is, it is a "good" or normal wheel. The removable support on which the spare wheel 82 is carried, as at 84, includes a removable acorn nut 86, so that the spare 82 and flat-tire wheel 20 may be readily interchanged. To facilitate the interchangeability, the support 84 is preferably welded to the body so as to be non-rotatable, which makes it easy to remove the nut 86, as by a special tool (not shown) conventionally provided with the vehicle. The same wrench of course may be used on the acorn nut 78 for the wheel 20, and this interchangeability is further facilitated by the fact that the front spring 36 includes means positively engaging the front axle 16 so as to prevent rotation thereof. In the specific instance illustrated, the axle 16 is provided with a pair of transversely spaced apart flattened portions 88, each of which is pierced or provided with an opening 90 for accommodating the associated spring leg 42. Hence, the bight 40 of the spring 36 lies ahead of the axle, the legs 42 pass respectively through the apertures 90 and thus in addition to acting on the axle prevent rotation thereof. This holds the axle while the acorn nut 78 is screwed on or off.

There is thus provided according to the invention a simple and novel construction which accomplishes all the advantages previously enumerated. Other features and advantages, not categorically listed, will readily occur to those versed in the art, as will many modifications and alterations in the preferred construction illustrated, all of which may be achieved without departure from the spirit and scope of the invention.

What is claimed is:

1. In a toy vehicle having a fore-and-aft body, a resilient axle-mounting therefor, comprising: an axle disposed transversely of the body; a pair of transversely spaced apart supports connected to the body and respectively having generally upright guide means respectively loosely receiving proximate end portions of the axle and permitting vertical movement of the axle relative to the body; and spring means acting between the body and the axle and biased to urge the axle downwardly, said spring means including a U-shaped member of relatively thin, narrow wire-like spring material having a transverse bight adjacent to and at one side of the axle and a pair of fore-and-aft legs joined to the bight and extending past and engaging the axle and terminating as terminal end portions at the other side of the axle, means removably connecting said terminal end portions to the body, and means including complementary interengaging portions on said axle and on said spring means operative positively to prevent both rotation and axial withdrawal of the axle relative to the body.

2. The invention defined in claim 1, in which: the axle portions of said last-named means include a pair of transversely spaced apart generally diametric apertures through the axle and spaced axially of the axle on the order of said legs, and said spring means portions are parts of the legs passed respectively through said apertures.

3. The invention defined in claim 1, in which: said means connecting the terminal end portions of the spring legs to the body includes a pair of transversely spaced apart body portions respectively proximate to each said terminal end portion, each body portion including a pair of fore-and-aft spaced apart openings and an intervening body part therebetween, each terminal end portion passing through one opening, over the intervening body part and back through the other opening.

4. In a toy vehicle having a fore-and-aft body, a resilient axle-mounting therefor, comprising: an axle disposed transversely of the body; a pair of transversely spaced apart supports connected to the body and respectively having generally upright guide means respectively loosely receiving proximate end portions of the axle and permitting vertical movement of the axle relative to the body; and spring means acting between the body and the axle and biased to urge the axle downwardly, said spring means including a U-shaped member of relatively thin, narrow spring material having a transverse bight adjacent to and at one side of the axle and a pair of fore-and-aft legs joined to the bight and extending past and engaging the axle and terminating as terminal end portions at the other side of the axle, and means connecting said ends to the body, each means including a U-shaped slot having front and rear transverse portions and a fore-and-aft portion exending between said transverse portions and a body part in the form of a tab bordered on three sides by said slot portions, the terminal end portion of each spring leg being received by its slot and tab by passing through one transverse slot portion, across the tab and back out through the other transverse slot portion, said terminal end portion of each spring leg having a vertically offset part enabling initial vertical inserting through the fore-and-aft slot portion and subsequent lateral shifting to hook said offset portion over the respective tab.

5. The invention defined in claim 4, in which: each tab is bendable to improve its grip on the respective offset portion.

6. The invention defined in claim 4, including: a further body part overlying the body in the areas of said slots and connected to the tabs to prevent displacement of said terminal end portions of the spring legs.

7. In a toy vehicle having a fore-and-aft body including an upper part, an axle and wheel mounting including: an axle projecting transversely from one side of the body at a level below that of said upper part, a wheel removably carried by said axle including a wheel body portion and a tire portion, said tire portion having a flat bottom part simulating a flat tire, and means assuring mounting of the wheel on the axle with said flat bottom part lowermost, including a laterally inwardly projecting element on the tire peripheral portion substantially diametrically opposite to said flat bottom part and extending over and adapted to engage said body upper part.

8. In a toy vehicle having a fore-and-aft body including an upper part, an axle and wheel mounting including: an axle projecting transversely from one side of the body at a level below that of said upper part, a wheel removably carried by said axle including a portion simulating damage to said wheel, and means assuring mounting of the wheel on the axle with said damage-simulating portion in a pre-selected position, including a laterally inwardly projecting element on the peripheral portion of the wheel and extending over and adapted to engage said body upper part.

References Cited in the file of this patent

UNITED STATES PATENTS

| | | |
|---|---|---|
| 2,838,875 | Hammond et al. | June 17, 1958 |
| 3,009,287 | Davis | Nov. 21, 1961 |

FOREIGN PATENTS

| | | |
|---|---|---|
| 553,347 | Great Britain | May 18, 1943 |